United States Patent
Hartig et al.

[11] Patent Number: 6,132,881
[45] Date of Patent: Oct. 17, 2000

[54] HIGH LIGHT TRANSMISSION, LOW-E SPUTTER COATED LAYER SYSTEMS AND INSULATED GLASS UNITS MADE THEREFROM

[75] Inventors: Klaus W. Hartig, Avoca, Wis.; Philip J. Lingle, Temperance; Steven L. Larson, Monroe, both of Mich.

[73] Assignee: Guardian Industries Corp., Auburn Hills, Mich.

[21] Appl. No.: 08/931,356

[22] Filed: Sep. 16, 1997

(Under 37 CFR 1.47)

[51] Int. Cl.[7] .............................. B32B 15/00; F21V 9/04
[52] U.S. Cl. ........................ 428/432; 428/34; 428/215; 428/428; 428/472; 428/698; 428/699; 428/701; 428/702; 359/360; 359/584; 359/585; 359/586
[58] Field of Search .............................. 428/34, 432, 433, 428/434, 469, 689, 699, 701, 702, 215, 216, 428, 472, 698, 913.3; 359/360, 359, 584, 585, 586

[56] References Cited

U.S. PATENT DOCUMENTS

| | | |
|---|---|---|
| 3,272,986 | 9/1966 | Schmidt . |
| 3,649,359 | 3/1972 | Apfel et al. . |
| 3,682,528 | 8/1972 | Apfel et al. . |
| 3,698,946 | 10/1972 | Kaspaul et al. . |
| 3,798,146 | 3/1974 | Wan et al. . |
| 3,846,152 | 11/1974 | Franz . |
| 3,889,026 | 6/1975 | Groth . |
| 3,901,997 | 8/1975 | Groth . |
| 3,962,488 | 6/1976 | Gillery . |
| 3,978,273 | 8/1976 | Groth . |
| 3,990,784 | 11/1976 | Gelber . |
| 4,022,947 | 5/1977 | Grubb . |
| 4,179,181 | 12/1979 | Chang . |
| 4,337,990 | 7/1982 | Fan et al. . |
| 4,413,877 | 11/1983 | Suzuki et al. . |
| 4,462,883 | 7/1984 | Hart . |

(List continued on next page.)

FOREIGN PATENT DOCUMENTS

| | | |
|---|---|---|
| 0031278 | 1/1981 | European Pat. Off. . |
| 0080182 | 1/1983 | European Pat. Off. . |
| 00140032 | 5/1985 | European Pat. Off. . |
| 0386993 | 9/1990 | European Pat. Off. . |
| 456487 | 11/1991 | European Pat. Off. . |
| 0546302 | 6/1993 | European Pat. Off. . |
| 0546470 | 6/1993 | European Pat. Off. . |
| 560534 | 9/1993 | European Pat. Off. . |
| 622645 | 11/1994 | European Pat. Off. . |
| 0646551 | 4/1995 | European Pat. Off. . |
| 0543077A1 | 11/1995 | European Pat. Off. . |
| 0543077B1 | 11/1995 | European Pat. Off. . |
| 511901 | 11/1992 | France . |
| 0303109 | 2/1989 | Germany . |
| 4006029 | 8/1990 | Germany . |
| 4018399 | 12/1991 | Germany . |
| 19520843 A1 | 12/1996 | Germany . |
| 63-242948 | 10/1988 | Japan . |
| 2027223 | 2/1980 | United Kingdom . |
| 9005439 | 5/1990 | WIPO . |

OTHER PUBLICATIONS

Super–E™ IV Airco coating technology, Process Release.

Super–EIII™ Coating Process Release.

Test method for measuring and calculating emitance of Architectural Flat Glass Products Using Radiometric Devices 1991 Proposed ASTM Standard (Primary Glass Manufacturers Council).

(List continued on next page.)

*Primary Examiner*—Donald Loney
*Attorney, Agent, or Firm*—Hall, Pridday, Myers & Vande Sande

[57] ABSTRACT

A high visible light transmitting, low-E sputter coating system, achieving neutral color and non-mirror-like appearance, useful in 2-pane and 3-pane IG units is achieved by an intermediate layer of silver, an undercoat of a metal oxide or nitride having an index of refraction of 2.35–2.75 and an overcoat of a metal oxide or nitride having an index of refraction of 1.85–2.25.

27 Claims, 2 Drawing Sheets

U.S. PATENT DOCUMENTS

| | | |
|---|---|---|
| 4,497,700 | 2/1985 | Groth et al. . |
| 4,548,691 | 10/1985 | Dietrich et al. . |
| 4,556,277 | 12/1985 | Fan et al. . |
| 4,594,137 | 6/1986 | Gillery et al. . |
| 4,639,069 | 1/1987 | Yatabe et al. . |
| 4,680,742 | 7/1987 | Yamada et al. . |
| 4,715,879 | 12/1987 | Schmitte et al. . |
| 4,716,086 | 12/1987 | Gillery et al. . |
| 4,780,372 | 10/1988 | Tracy et al. . |
| 4,786,784 | 11/1988 | Nikodem et al. . |
| 4,790,922 | 12/1988 | Huffer . |
| 4,799,745 | 1/1989 | Meyer et al. . |
| 4,806,220 | 2/1989 | Finley . |
| 4,826,525 | 5/1989 | Chesworth et al. . |
| 4,883,721 | 11/1989 | Nalepka et al. . |
| 4,943,484 | 7/1990 | Goodman . |
| 4,960,645 | 10/1990 | Lingle et al. . |
| 5,061,567 | 10/1991 | Brochot et al. ............ 428/432 |
| 5,188,887 | 2/1993 | Linge et al. . |
| 5,201,926 | 4/1993 | Szczyrbowski . |
| 5,229,194 | 7/1993 | Lingle et al. . |
| 5,242,560 | 9/1993 | Lingle et al. . |
| 5,264,286 | 11/1993 | Ando et al. ............... 428/432 |
| 5,296,302 | 3/1994 | O'Shaughnessy et al. . |
| 5,298,048 | 3/1994 | Lingle et al. . |
| 5,302,449 | 4/1994 | Eby et al. . |
| 5,306,547 | 4/1994 | Hood et al. ............... 428/432 |
| 5,318,685 | 6/1994 | O'Shaughnessy . |
| 5,332,888 | 7/1994 | Tausch et al. . |
| 5,344,718 | 9/1994 | Hartig et al. . |
| 5,376,455 | 12/1994 | Hartig et al. . |
| 5,377,045 | 12/1994 | Wolfe et al. . |
| 5,425,861 | 6/1995 | Hartig et al. . |
| 5,543,229 | 8/1996 | Ohsaki et al. . |
| 5,563,734 | 10/1996 | Wolfe et al. . |
| 5,688,585 | 11/1997 | Lingle et al. ............ 428/216 |
| B1 4,799,745 | 2/1992 | Meyer et al. . |

OTHER PUBLICATIONS

Standard Test Methods for Solar Energy Transmittance and Reflectance(Terrestrial) of Sheet Materials, ASTM.

NFRC 200–93:Procedure for Determining Fenestration Product Solar Heat gain coefficients at normal incidence, Jan. 1993 NFRC.

NFRC 301–93 Standard Test Method for Emittance of Specular Surfaces Using Spectrometric Measurements, Jan. 29, 1993 NFRC.

Program Description. APC Program. Window 4.1 for analyzing window thermal performance in accordance with standard NFRC Procedures: Windows and Daylighting Group Mar. 1994.

Standard Method for Computing the Colors of Objects by Using the CIE System: American Society for Testing and Materials Mar. 1989.

Standard Test Method for Calculation of Color Differences from Instrumentally Measured Color Coordinates: American Society for Testing and Materials Nov. 1993.

Viracon Solarscreen 2000™ New Product Bulletin May 1994.

Knittl, Zdenek, "Optics of Thin Films", John Wiley & Sons, Ltd, London 1976 p. 284.

Wolf–Dieter Münz & Stefan R. Reinback, Performance and sputtering criteria of modern architectural glass coatings Jan. 26–27, 1982.

Envelope—Exhibit A—Correspondence between Counsel for Lingle/Larson and Counsel for Hartig (Inventor refusing to sign Declaration).

HIGH LIGHT TRANSMISSION, LOW-E SPUTTER COATED LAYER SYSTEMS AND INSULATED GLASS UNITS MADE THEREFROM

FIELD OF THE INVENTION

This invention relates to coating systems for glass substrates which exhibit high visible light transmission and very low emissivity values, and are substantially neutral in color. More particularly, this invention relates to glass articles, such as insulating glass units (e.g. doors and windows) which are provided with these coating systems, and methods of making them.

BACKGROUND OF THE INVENTION

The importance of sputter-coated glass layer systems for achieving solar management properties in many types of glass articles, such as architectural windows and doors, is now well established in commerce. In addition, the importance of using such layer systems in insulating glass units (known as "IG" units in the art) is equally well established. Examples of this latter use include multipaned windows and doors made up of at least two panes of glass sealed at their peripheral edges to form an insulating chamber therebetween. Such chambers, in this respect, are often made by evacuating the air from the chamber, sealing the glass panes at their edges and filling the chamber formed with a gas other than air, such as argon.

Important to the acceptance of solar management glasses, including IG units, in the marketplace are the following characteristics which relate directly to the sputter-coated layer system employed:

1) the desired amount of visible transmittance coupled with an acceptable level of infrared radiation reflectance;
2) a non-mirror-like appearance (i.e. a low visible "reflectance" as defined below); and
3) a substantially neutral visible reflected color when viewed from the glass side (i.e. a color falling within the range of from colorless to slightly blue).

In addition to these characteristics, the coating system employed must be economical to produce. If it is not, the ultimate product, such as in an IG unit, may become so expensive as to inhibit demand.

It is well-known in the art that these desired characteristics often conflict when attempting to achieve them, and that, therefore, trade-offs often become necessary. For example, simultaneous achievement of very high levels of visible transmittance with an acceptably high level of IR (infrared) reflection may either become impossible to achieve, or only possible with undesirably high levels of reflectance and unacceptable colors. This problem is particularly acute in IG units where, for example, three panes of glass are employed. While three pane IG units allow for increased insulation, and a layer system on two or more internal surfaces, the use of more than one layer has in the past, prior to this invention, resulted in either too low a resultant visible transmittance or, to achieve the necessary level of visible transmittance, a less than optimal IR reflectance.

In other trade-offs, undesirable colors and mirror-like windows (or doors) become unavoidable. In still further trade-offs, cost of production becomes a significant factor.

The above-described problems create a need in the art for a new sputter-coated layer system which can achieve a better balance among these characteristics, and finds particular utility not just on monolithic substrates but in two, three, or more pane IG units.

In recent years the use of $Si_3N_4$ in various layer systems has become known and the subject inventors along with others have created various, commercially, acceptable layer systems employing one or more layers of $Si_3N_4$, often with silver, to achieve relatively high levels of IR reflectance, such that the resulting glasses are appropriately referred to as "low-E" glasses. Such glasses, however, have not been able to achieve the high levels of visible light transmittance exhibited in this invention. Examples of such glasses are found in U.S. Pat. Nos. 5,376,455; 5,344,718; and 5,377,045 just to name a few. Moreover, combinations of silver, nickel and chromium with $TiO_2$ have been employed to achieve low-E glasses. See U.S. Pat. No. 5,563,734.

Aesthetically, both mirror-like and purple color qualities may eliminate the marketability of any product exhibiting these characteristics. Loss of visible transmittance while undesirable, does not become truly objectionable until, in a monolithic sheet, it drops below about 70% and in an IG unit it drops below about 63%. However, in certain uses, where low shading coefficients are not required, it is desirable for commercial purposes to have the visible transmission of a monolithic sheet at least about 84% while achieving at the same time a high IR reflectance, as represented by a sheet resistance ($R_s$) of less than or equal to about 5.5 ohms/sq. and a normal emissivity ($E_n$) of less than or equal to about 0.065, all while maintaining a substantially neutral color as viewed from both the film side and glass side of the substrate, coupled with a non-mirror-like reflectance characteristic.

In U.S. Pat. No. 5,302,449 there is reported a rather complex layer system as well as its presumed commercial counterpart in IG unit form. Commercially, the system is known as Cardinal 171 sold by Cardinal IG Company. The layer system as taught in this patent varies the thicknesses and types of materials in the layer stack to achieve certain solar management qualities, as well as employing an overcoat of an oxide of zinc, tin, indium, bismuth, or oxides of their alloys including the oxide of zinc stannate, to achieve abrasion resistance. In addition, the system employs one or two layers of gold, copper or silver to achieve its end results. When two layers of silver are used it is said that the first is between 100 Å–150 Å and preferably about 125 Å in thickness while the second, based thereon, is to be between 125 Å–175 Å. When only one silver layer is employed, it is taught that its thickness is to be about 100 Å–175 Å, and preferably 140 Å.

In actual commercial practice, the aforesaid Cardinal IG units have been found to achieve quite acceptable color characteristics and relatively good non-mirror-like visible reflectance. However, this otherwise quite acceptable IG system has been found to have visible transmittance properties less than 75%.

It has also been known, prior to our invention, to use various combinations of metallic and oxide layers of such elements as tin, zinc, silver, indium, aluminum, titanium, chromium, nickel, magnesium, silicon nitride, and the like, in order to achieve certain desired combinations of solar management properties. For example, in U.S. Pat. No. 4,548,691 a high visible transmittance layer system is disclosed (e.g. $T_{vis}$ 85–86%). Such a layer system from the glass outwardly generally comprises: $SnO_2$ or In/Ag/Al, Ti, Zr, Cr or Mg/$SnO_2$ or In.

The silver layer is said to be on the order of 50–150 Å thick. In practice, such a system, while having high visible light transmittance, unfortunately, exhibits a light purple coloration, and has a rather high sheet resistance of about 6.7–8.2 ohms/square. This, coupled with the thinness of its silver layer, manifests itself in a rather low level of IR reflectance in the ultimate layer system provided.

Another layer coating system known prior to our invention consists from the glass substrate outwardly: $SnO_2/ZnO/Ag/ZnO/SnO_2$. In this coating system, ZnO is used to reduce sheet resistance (Re) and emittance (En) by, it is believed, providing a smoother surface on which to deposit the silver (i.e. providing a nucleating layer for the silver apparently superior than the known use of other known nucleating materials). Moreover, the visible light transmittance ($T_{vis}$) is an acceptably high 84% (R, is about 5.3 ohms/sq. and $E_n$ is 0.060). Unfortunately, the color manifested by this layer system is an undesirable purple.

In yet another type of layer coating system known prior to our invention, and reported in German published Application DE 19520843A1, a sub-stoichiometric metallic oxide layer (e.g. $ZnO_x$, $ZnTaO_x$, $TaO_x$) is employed as an essential layer beneath the silver layer to increase the conductivity of the Ag layer in a system described generally as, from the substrate outwardly:

substrate/oxide/sub-oxide/Ag/blocker/oxide.

A doubling of the system is also contemplated. According to this published disclosure, the oxide layers are transparent anti-reflective layers (e.g. Bi Al-oxide, Sn Mg-oxide, etc.), while the blocker or barrier layer is an adhesion mediating layer of metal or sub-oxide (e.g. oxide or sub-oxide of Ti, Cr, Nb) serving to protect the Ag layer from aggressive environmental atmospheres. It is said that through the use of a special sub-oxide layer (e.g. $ZnO_x$, $TaO_x$ etc.) beneath the silver layer, the conductivity of the silver is enhanced as much as 30%, leading to the combination of a low-E and high visible transmission layer coating system. As demonstrated in this published disclosure, the necessity of having to form a sub-stoichiometric metallic oxide layer beneath the Ag layer(s), in order to achieve the desired emissivity and visible transmission values over the then known prior art system, adds an undesirable complexity to the manufacturing process.

In still another prior art, commercial product sold by our assignee (and constituting our invention), a first layer of $TiO_2$ is employed. However, thereafter, the layer system is quite distinct from this invention since this prior art system employs both $Si_3N_4$ and nichrome layers to surround the silver. Moreover, while an excellent layer system for many monolithic and IG unit applications, it does not achieve the very high $T_{vis}$ characteristics of this invention and, thus, is not, for example, useful in all IG applications where three panes are used or high visible light transmittance is required.

In view of the above, it is apparent that there exists a need in the art for a high visible light transmitting, high IR reflecting layer system which also, preferably is durable, substantially neutral in color, does not require the additional step of forming a sub-stoichiometric metallic oxide layer beneath the metallic conductive layer (e.g. beneath a silver layer), does not exhibit a significant purple tint, and does not have a mirror-like appearance. It is a purpose of this invention to fulfill this and other needs in the art which will become more apparent to the skilled artisan once given the following disclosure:

SUMMARY OF THE INVENTION

In one aspect of this invention, there is provided a sputter-coated glass article comprised of a glass substrate having on one of its planar surfaces, from the glass outwardly, a layer system including:

a) an undercoat layer comprised of metal oxide or nitride having an index of refraction of about 2.35–2.75;

b) a layer comprised of metallic silver, and c) an overcoat layer comprised of a metal oxide or nitride having an index of refraction of about 1.85–2.25;

wherein these layers are of a thickness sufficient such that the glass article has a visible transmittance ($T_{vis}$) of at least about 84%, a sheet resistance ($R_s$) of less than or equal to about 5.5 ohms/sq., and a normal emissivity ($E_n$) of less than or equal to about 0.065 and wherein said layer system does not include any layer consisting essentially of a sub-stoichiometric metallic oxide located between the substrate and the layer comprised of metallic silver.

In certain embodiments, the glass article is a monolithic glass sheet which, with the layer system thereon, exhibits a substantially neutral, non-purple color from both the film side and glass side, and has a substantially non-mirror-like reflectance. Such monolithic glass sheets preferably exhibit at a thickness of 2 mm (clear glass) the following characteristics:

$T_{vis}$=84%–90%

$R_s$=4.5 to 6.5 (ohms/sq.)

$E_n$=0.04–0.07

In certain further aspects of this invention two or more sheets of glass are combined into an IG (i.e. insulating glass) unit wherein, on at least one internal surface of such an IG unit there is provided the above-described layer system.

This invention will now be described with respect to certain embodiments thereof, along with reference to the accompanying illustrations, wherein:

DETAILED DESCRIPTION OF EMBODIMENTS OF THE INVENTION

Certain terms are prevalently used in the glass-coating art, particularly when defining the properties and solar management characteristics of coated glass used in the architectural field. Such terms are used herein in accordance with their well-known meaning. For example, as used herein:

Intensity of visible wavelength light, "reflectance" is defined by its percentage and is reported as $R_xY$ (i.e. the Y value cited below in ASTM 308-85), wherein "X" is either "G" for glass side or "F" for film side. "Glass side" (e.g. "G") means, as viewed from the side of the glass substrate opposite that on which the coating resides, while "film side" (i.e. "F") means, as viewed from the side of the glass substrate on which the coating resides. When reported for an IG unit the subscript "G" denotes "outside" and "F" denotes "inside" (i.e. from "outside" the dwelling, or from "inside" the dwelling, as the case may be).

Color characteristics are measured on the "a" and "b" coordinates. These coordinates are indicated herein by the subscript "h" to signify the conventional use of the Hunter method (or units) Ill. C, 10° observer, according to ASTM D-2244-93 "Standard Test Method for Calculation of Color Differences From Instrumentally Measured Color Coordinates" Sep. 15, 1993 as augmented by ASTM E-308-85, Annual Book of ASTM Standards, Vol. 06.01 "Standard Method for Computing the Colors of Objects by Using the CIE System".

The terms "emissivity" and "transmittance" are well understood in the art and are used herein according to their well-known meaning. Thus, for example, the term "transmittance" herein means solar transmittance, which is made up of visible light transmittance, infrared energy transmittance, and ultraviolet light transmittance. Total solar energy transmittance is then usually characterized as a weighted average of these other values. With respect to these transmittances, visible transmittance, as reported herein, is characterized by the standard Illuminant C technique at 380–720 nm; infrared is 800–2100 nm; ultraviolet is 300–400 nm; and total solar is 300–2100 nm. For purposes of emissivity, however, a particular infrared range (i.e. 2,500–40,000 nm) is employed, as discussed below.

Visible transmittance ($T_{vis}$) can be measured using known, conventional techniques. For example, by using a spectrophotometer, such as a Beckman 5240 (Beckman Sci. Inst. Corp.), a spectral curve of transmission is obtained. Visible transmission is then calculated using the aforesaid ASTM 308/2244-93 methodology. A lesser number of wavelength points may be employed than prescribed, if desired. Another technique for measuring visible transmittance is to employ a spectrometer such as a commercially available Spectragard spectrophotometer manufactured by Pacific Scientific Corporation. This device measures and reports visible transmittance directly. As reported and measured herein, visible transmittance (i.e. the Y value in the CIE tristimulus values, ASTM E-308-85) uses the Ill. C., 10° observer.

"Emissivity" (E) is a measure, or characteristic of both absorption and reflectance of light at given wavelengths. It is usually represented by the formula:

$$E = 1 - \text{Reflectance}_{film}$$

For architectural purposes, emissivity values become quite important in the so-called "mid-range", sometimes also called the "far range" of the infrared spectrum, i.e. about 2,500–40,000 nm., for example, as specified by the WINDOW 4.1 program, LBL-35298 (1994) by Lawrence Berkley Laboratories, as referenced below. The term "emissivity" as used herein, is thus used to refer to emissivity values measured in this infrared range as specified by "STANDARD TEST METHOD FOR EMITTANCE OF SPECULAR SURFACES USING SPECTROMETRIC MEASUREMENTS" NFRC 301-93 (adopted Jan. 29, 1993, National Fenestration Rating Council, Silver Spring, Md.). In this Standard, emissivity is reported as hemispherical emissivity ($E_h$) and normal emissivity ($E_n$).

The actual accumulation of data for measurement of such emissivity values is conventional and may be done by using, for example, a Beckman Model 4260 spectrophotometer with "VW" attachment (Beckman Scientific Inst. Corp.). This spectrophotometer measures reflectance versus wavelength, and from this, emissivity is calculated using the aforesaid 1991 Proposed ASTM Standard which has been incorporated herein by reference.

Another term employed herein is "sheet resistance". Sheet resistance ($R_s$) is a well-known term in the art and is used herein in accordance with its well-known meaning. Generally speaking, this term refers to the resistance in ohms for any square of a layer system on a glass substrate to an electric current passed through the layer system. Sheet resistance is an indication of how well the layer is reflecting infrared energy, and is thus often used along with emissivity as a measure of this characteristic. "Sheet resistance" is conveniently measured by using a 4-point probe ohmmeter, such as a dispensable 4-point resistivity probe with a Magnetron Instruments Corp. head, Model M-800 produced by Signatone Corp. of Santa Clara, Calif.

Thicknesses of the various layers in the systems reported are measured by, and thus the term, "thickness" as used herein is defined by alternative techniques. In one technique, known optical curves, or, in the alternative, the use of a conventional ellipsometer is employed. In another and particularly advantageous technique, an "n & k" analyzer is used (n & k Technology, Inc., Santa Clara, Calif.). This technique is believed to be generally described in U.S. Pat. No. 4,905,170, along with the ability to determine the "n" (i.e. refractive index) and "k" (i.e. the coefficient of extinction) values of the film under investigation. The disclosure of this patent is incorporated herein by reference. Such procedures and techniques are well-known to the skilled artisan. In this respect the terms "refractive index" ("n") and "co-efficient of extinction" ("k") are terms well understood and defined in the art, and are used and defined herein in accordance therewith.

One of the truly unique features of the layer systems contemplated by this invention is the combined ability to obtain high $T_{vis}$ at the same time that low $E_n$'s are achieved. In short, the layer systems of this invention simultaneously, and unexpectedly achieve high visible light transmittance (e.g. ≧84% monolithic) while achieving truly high IR reflectance values as manifested by very low $E_n$ values, and usually very low $R_s$ values as well. Moreover, these low-E and $R_s$ values, coupled with the high $T_{vis}$ values, are unexpectedly achieved without the need for a separate sub-stoichiometric metallic oxide layer beneath the silver layer as heretofore thought essential as taught in the aforesaid German published Application DE 19520843A1. In short, and directly contrary to this prior art disclosure, by following the teachings of this invention, the need for such a sub-stoichiometric layer (and its expense) is avoided, while monolithic visible transmissions ($T_{vis}$'s of at least 84%, $R_s$'s of less than or equal to 5.5 ohms/$_{sq}$. and $E_n$'s of less than or equal to 0.065 are readily achieved.

In this respect, certain layer systems of this invention employ ZnO in at least one layer. [The term "ZnO" as used herein, as well as the reporting of other metallic oxides by their appropriate nomenclature, e.g. "$Bi_2O_3$", designates the formation of an oxide layer consisting essentially of a stoichiometric oxide. It is only when the oxide is reported as $MO_x$, where M is the metallic ion, that the term is used to designate a layer consisting essentially of a sub-stoichiometric oxide, as is done in the aforesaid German published application.] While, heretofore, it was known to use ZnO to reduce sheet resistance ($R_s$) and emittance (e.g. $E_n$) in a layer system in which two layers of ZnO sandwiched silver and themselves were sandwiched by two layers of $SnO_2$ (as discussed above), such knowledge does not predict or explain the unexpected findings of this invention. In this respect it is also to be pointed out that while silver (Ag) is a well-known IR reflector it has the drawback of creating an objectionable mirror-like reflectance. Thus, the ability to use ever thicker layers of silver to increase IR reflectance heretofore simply meant the acceptance in return of more undesirable visible light (mirror-like) reflectance and objectionable colors. The known prior art, in this respect, would then generally attempt to handle this problem by using known anti-reflective layers and color modifying layers (e.g. $TiO_2$, $Si_3N_4$, $SnO_2$, ZnO, $Bi_2O_3$, Zn stannate) which then usually necessitate the use of protective layers (e.g. Zn, Al, Ti, NiCr, or oxides or nitrides thereof). The complexity and expense of such layers often meant that they were not truly commercially viable.

The subject invention avoids this prior art dilemma based upon its unexpected finding that for a given thickness of silver (Ag) there is an applicable range of indices of refraction ("n") for the undercoat layer and the overcoat layer, the two indices "n" being different one from the other, such that if certain ranges of thicknesses are adhered to, unexpectedly low levels of $E_n$ and unexpectedly high levels of $T_{vis}$ are achieved without a mirror-like appearance and an objectionable purple color occurring and without the need for producing a separate sub-stoichiometric metallic oxide layer beneath the silver to enhance the conductivity of the silver.

Based upon this finding, it has now been discovered that if a layer of silver is surrounded (i.e. sandwiched) between an undercoat layer consisting essentially of a stoichiometric metallic oxide or nitride layer having an index of refraction of about 2.35–2.75, and preferably 2.55 to 2.75, coupled with an overcoat layer of a metallic oxide or nitride having an index of refraction of about 1.85–2.25, and preferably 1.95 to 2.15, by adjusting the relative thicknesses of the layers accordingly, the resultant monolithic glass article (e.g. clear, colorless soda-lime-silica float glass sheet) may be tailored to have a visible light transmittance ($T_{vis}$) of at least about 84%, a sheet resistance ($R_s$) of less than or equal to about 5.5 ohms/sq., a normal emissivity ($E_n$) of less than or equal to about 0.065, a substantially non-purple color when viewed from either (or both) the film side and glass side, and a substantially non-mirror-like reflectance.

The layer systems of this invention include the above-described three layers as the essential layers in the system. However, in certain preferred embodiments other layers are added to the layer stack to achieve certain further desired effects. For example, an upper and/or lower barrier layer(s) may be employed between the silver and the aforesaid overcoat and undercoat layers. Such layers, of course, are chosen in thickness and composition so as not to interfere adversely with the overall objective to be achieved.

In this respect, an additional upper barrier layer immediately above the silver layer, may be used to protect the silver. Similarly, an additional lower barrier layer immediately below the silver layer may be used for the purpose of providing a nucleating layer for the silver. In neither event, however, should either barrier layer be so thick as to lower the $T_{vis}$ below its desired amount. Other layers may be added for their known purposes (e.g. scratch resistance), but in the same manner must not be so thick as to lower the $T_{vis}$ below its desired amount.

Generally speaking, the thickness of the three above-described essential layers may be varied to meet the desired end result. For most purposes in this respect the silver layer should have a thickness of about 100 Å to 180 Å and preferably 140 Å to 170 Å.

The undercoat layer as contemplated herein, as stated above, must have an index of refraction ("n") of about 2.35–2.75, preferably of 2.55 to 2.75. Examples of undercoat materials include $TiO_2$, $ZrO_2$, PbO, $W_2O_3$, SiZrN, SiTiN or mixtures thereof, or multiple layers thereof. $TiO_2$ is preferred. Generally speaking whether this undercoat layer (system) includes one or more layers of these materials, the thickness of the entire undercoat having the aforesaid index of refraction should be about 160 Å–320 Å, and preferably 200 Å to 300 Å to achieve the purposes of this invention.

The overcoat layer as contemplated herein, as stated above, must have an index of refraction ("n") of about 1.85–2.25, preferably 1.95 to 2.15. Examples of such overcoat materials include ZnO, $SnO_2$, $In_2O_3$, $Si_3N_4$, or mixtures or multiple layers thereof. $SnO_2$ is preferred. Generally speaking, whether this overcoat layer (system) includes one or more layers of these materials, the thickness of the entire overcoat having the aforesaid index of refraction should be about 350 Å–700 Å, and preferably 400 Å to 550 Å to achieve the purposes of this invention.

As for the lower optional barrier (nucleating) layer, it may be formed of the essentially stoichiometric oxides or nitrides of Zn, Ti, Sn, Bi, or Si. Here the thicknesses should be relatively thin, on the order of no more than 150 Å, preferably 30 Å–75 Å, and most preferably about 50 Å when ZnO is used. Confirmation that the oxide layers formed consist essentially of stoichiometric metallic oxide may be achieved by using the aforesaid "n & k" analyzer and, in particular, the "k" value (i.e. coefficient of extinction). Any substantial amount of extinction measured indicates the possible presence of sub-stoichiometric metallic oxide. In the practice of the preferred embodiments of this invention it is most desireable to have "k" at essentially zero, i.e. $0-\leqq0.01$.

As for the upper optical barrier (protective) layer, it may be formed of the oxides or nitrides of Al, Ti, Zn, Sn, Zr, Cr, Ta or Mg. $TiO_2$ is preferred. Here the thickness should be even thinner than the lower barrier (nucleating) layer, on the order of no more than 15 Å, preferably 5 Å–15 Å, and most preferably about 10 Å when $TiO_2$ is used.

Figure 1:
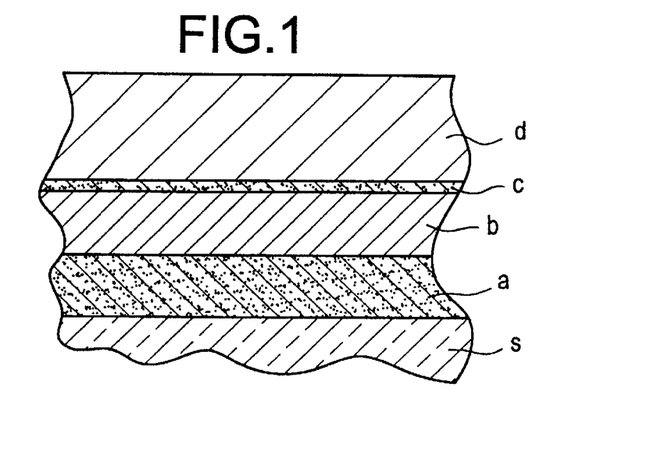
FIG. 1 is a partial side sectional view of an embodiment of a layer system according to this invention.
Figure 2:
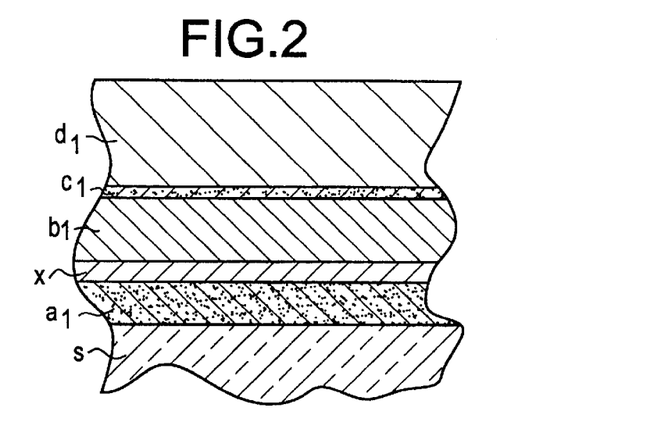
FIG. 2 is a partial side sectional view of another embodiment of this invention.

Turning now to FIGS. 1 and 2, there are illustrated two partial cross-sectional sketches of two different embodiments of this invention. As can be seen, there is employed in each, a conventional glass substrate "s" used in the architectural art. Such glass is preferably made by the conventional "float" process and thus is referred to as "float glass". The usual thickness thereof may be from about 2 mm–6 mm. The composition of the glass is not critical, and may vary widely. Typically, the glass employed is one of the soda-lime-silica family of glass well-known in the glass art.

The process and apparatus used to form the various layers on glass substrate, moreover, may be a conventional multi-chamber (multi-target) sputter-coating system such as is produced by Airco, Inc. (i.e. currently The BOC Group, Inc.) Conventional techniques are used to sputter-coat the layers and their operating parameters are well-known to those skilled in the art.

With reference first to FIG. 1, first layer "a" is formed on the substrate "s". This is the essential undercoat layer as described above, which in this embodiment is $TiO_2$ having a thickness of 290 Å and an index of refraction "n" of 2.56. Next, layer "b" is a layer of metallic silver which in this embodiment has a thickness of 165 Å. On top of layer "b" there is provided optional protective layer "c" which in this embodiment is another layer of $TiO_2$ but having a thickness of only 10 Å. Finally, essential overcoat layer "d" is provided. In this embodiment layer "d" is $SnO_2$ having a thickness of 480 Å and an index of refraction of 2.05. In this embodiment, the glass substrate is clear soda-lime-silica float glass having a thickness of about 2 mm.

With reference now to FIG. 2, another embodiment of this invention is illustrated. Here a first essential layer "$a_1$," is provided. It is again, $TiO_2$, but having a thickness of 224 Å and an index of refraction 2.56. Next, a lower optional barrier (nucleating) layer "x" is formed of ZnO in a thickness of 52 Å. The ZnO formed is essentially stoichiometric having a "k" value of essentially zero (i.e. ≦0.01). On top of layer "x" is provided silver layer "$b_1$", having a thickness of 165 Å. Protective, upper optional barrier layer "$c_1$", of $TiO_2$ is next provided in a thickness of 10 Å. Finally, essential overcoat layer "$d_1$", of $SnO_2$ is provided in a thickness of 480 Å.

A typical set of operating parameters for forming the layer system of FIG. 2 is as follows:

Its color is substantially neutral as viewed from both the glass side and film side as represented by the following color coordinates, Ill. C 10° Hunter:

| $T_{VIS}$ = 87.15 | $R_G$ = 6.19 | $R_F$ = 4.59 |
|---|---|---|
| $a_h$ = −2.76 | $a_h$ = 1.64 | $a_h$ = 1.83 |
| $b_h$ = 3.33 | $b_h$ = −8.79 | $b_h$ = −9.35 |

TABLE 1

| Layer | Material | Ar (SCCM) | $N_2$ (SCCM) | $O_2$ (SCCM) | Press. (Torr) | Cathode Power (KW) | Cathode Voltage (Volts) | Cathode Current (Amps) | Line Speed % | No. of Passes |
|---|---|---|---|---|---|---|---|---|---|---|
| $a_1$ | Titanium | 45 | 0 | 15 | $2 \times 10^{-3}$ | 4.2 | 509 | 8.1 | 45 | 8 |
| x | Zinc | 40 | 0 | 40 | $2 \times 10^{-3}$ | 1.5 | 358 | 4.1 | 45 | 3 |
| $b_1$ | Silver | 40 | 0 | 0 | $2 \times 10^{-3}$ | 3.9 | 447 | 8.9 | 100 | 1 |
| $c_1$ | Titanium | 45 | 0 | 0 | $2 \times 10^{-3}$ | 0.5 | 340 | 1.5 | 100 | 1 |
| $d_1$ | Tin | 25 | 0 | 40 | $2 \times 10^{-3}$ | 2.4 | 410 | 5.9 | 45 | 3 |

It is to be noted here that when the $O_2$% is used in this amount, the resulting layers of a, and x consist essentially of $TiO_2$ and ZnO, respectively (i.e. both are essentially formed of stoichiometric titanium dioxide and stoichiometric zinc oxide).

When so formed, this monolithic glass sheet (thickness 2 mm) exhibits the following characteristics:

$T_{vis}$=89.11%

$E_n$=0.054

$R_s$=4.80 ohm/sq.

Its color is substantially neutral as viewed from both the glass side and film side as represented by the following color coordinates, Ill. C 10° Hunter:

| $T_{VIS}$ = 89.11 | $R_G$ = 5.30 | $R_F$ = 4.28 |
|---|---|---|
| $a_h$ = −2.18 | $a_h$ = 2.78 | $a_h$ = 2.88 |
| $b_h$ = 2.14 | $b_h$ = −8.44 | $b_h$ = −6.90 |

Figure 3:
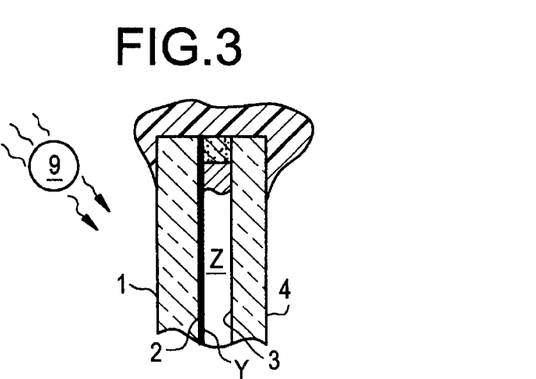
FIG. 3 is a partial cross-sectional end view of a dual pane IG unit as contemplated by this invention.
Figure 3A:
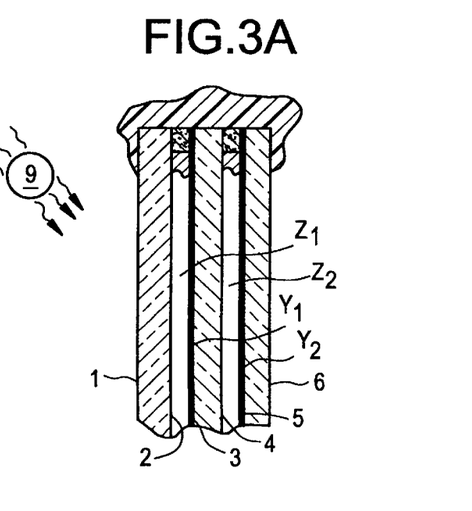
FIG. 3A is a partial cross-sectional end view of a tri-pane IG unit as contemplated by this invention.
Figure 4:
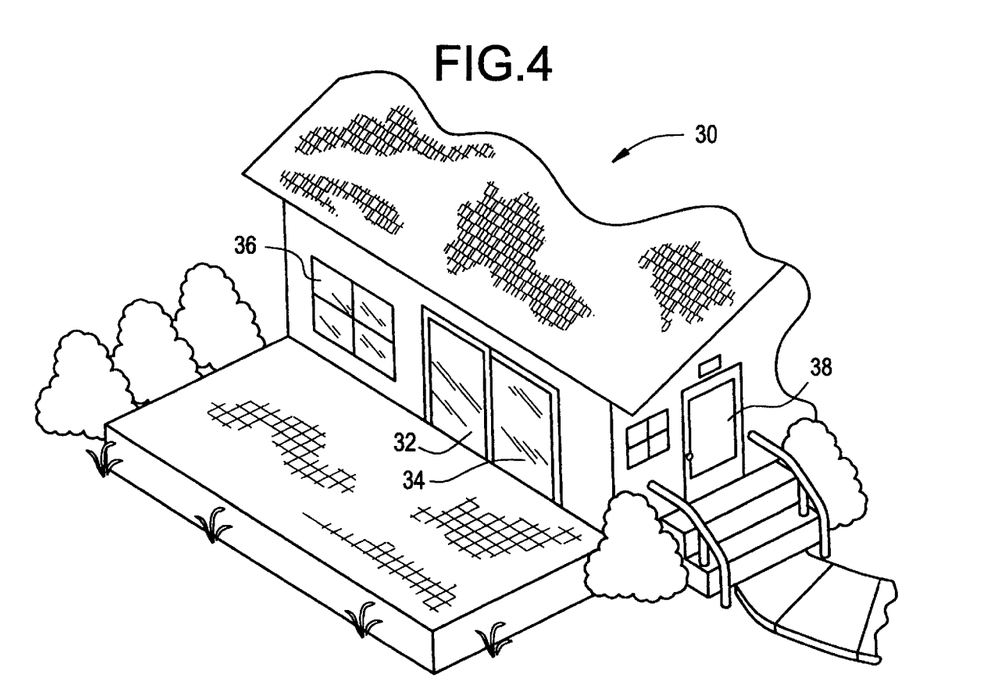
FIG. 4 is a partial schematic perspective view of a house employing as a window, door, and wall, an IG unit such as illustrated in FIGS. 3 and 3A.

A typical set of operating parameters for forming the layer system of FIG. 1 is as follows:

One of the significant advantages of this invention is that the unique achievement of both high visible light transmittance and high IR reflectance (without the need for a sub-stoichiometric metallic oxide layer beneath the silver) enables the coated glass articles of this invention to be used in multi-pane IG units for windows and doors (i.e. for what is known in the art as "architectural" purposes). FIGS. 3 and 3A illustrate schematically a typical 2-pane and 3-pane IG unit, respectively which employ the coated glass sheets of this invention. FIG. 4 illustrates a typical dwelling 30 provided with a fixed patio door 32, a sliding patio door 34, window 36 and "storm" door 38. All may advantageously employ the layer coating systems of this invention to achieve high visible light transmission while significantly reducing the flow of heat (IR) energy both from within to the outside and vice versa, while achieving by way of a 2-pane or 3-pane IG unit, excellent insulating properties.

For purposes of clarity, and with reference to FIGS. 3 and 3A, the sun 9 is shown and the term "inside" is presented to orient the IG unit in a dwelling. Obviously, the sun 9 illustrates the outside of the dwelling while "inside" means within the dwelling. Thus, surface 1 in FIGS. 3 and 3a are exposed to the elements while surface 4 and 6, respectively,

TABLE 2

| Layer | Material | Ar (SCCM) | $N_2$ (SCCM) | $O_2$ (SCCM) | Press. (Torr) | Cathode Power (KW) | Cathode Voltage (Volts) | Cathode Current (Amps) | Line Speed % | No. of Passes |
|---|---|---|---|---|---|---|---|---|---|---|
| a | Titanium | 45 | 0 | 15 | $2 \times 10^{-3}$ | 4.2 | 509 | 8.1 | 45 | 14 |
| b | Silver | 40 | 0 | 0 | $2 \times 10^{-3}$ | 3.9 | 447 | 8.9 | 100 | 1 |
| c | Titanium | 45 | 0 | 0 | $2 \times 10^{-3}$ | 0.5 | 340 | 1.5 | 100 | 1 |
| d | Tin | 25 | 0 | 40 | $2 \times 10^{-3}$ | 2.4 | 410 | 5.9 | 45 | 3 |

It is again noted here that the layer "a" so formed consists essentially of stoichiometric titanium dioxide (i.e. $TiO_2$). When so formed, this monolithic glass sheet (thickness 3.1 mm) exhibits the following characteristics:

$T_{vis}$=87.15

$E_n$=0.061

$R_s$=4.87 ohms/sq.

are within the dwelling. Characteristically then, the remaining surfaces within the IG unit are consecutively numbered as 2 and 3 in FIG. 3 and 2, 3, 4, and 5 in FIG. 3A. Generally speaking, in a 2-pane IG unit (FIG. 3), the coating system "Y" of this invention may be provided on inner surface 2 within the insulating chamber "z". In a 3-pane IG unit (FIG. 3A), the coating systems "$Y_1$ and $Y_2$" may be provided on inner surfaces 3 and 5 within insulating chambers $Z_1$ and $Z_2$, respectively. Other surfaces may be utilized if desired. Due to the uniquely high $T_{vis}$ characteristics of this invention, two sputter coated layers $Y_1$ and $Y_2$ may be employed, thereby to achieve truly exceedingly high levels of IR reflectance while still maintaining $T_{vis}$ in an acceptable range for IG units of $\geq 70\%$.

Typical ranges of characteristics achieved by this invention when used in a 2-pane IG unit such as shown in FIG. 3 are:

[when surface 2 has coating]

|  | Range | | Layer System | Layer System |
|---|---|---|---|---|
| Characteristics | Broad | Preferred | FIG. 1 | FIG. 2 |
| $T_{vis}$ | $\geq 75\%$ | $\geq 80\%$ | 79.6% | 81.0% |
| $R^*_{outside}$ | $\leq 15\%$ | $\leq 12\%$ | 12% | 11% |
| $R^*_{inside}$ | $\leq 15\%$ | $\leq 12\%$ | 13% | 12% |
| S.C. | $\geq 0.60$ | $\geq 0.63$ | 0.62 | 0.64 |
| $U_{winter}$ | $\leq 0.26$ | $\leq 0.25$ | 0.25 | 0.25 |

*R = reflectance (visible)

[when surface 3 has coating]

|  | Range | | Layer System | Layer System |
|---|---|---|---|---|
| Characteristics | Broad | Preferred | FIG. 1 | FIG. 2 |
| $T_{vis}$ | $\geq 75\%$ | $\geq 80\%$ | 79.6% | 81.0% |
| $R^*_{outside}$ | $\leq 15\%$ | $\leq 12\%$ | 13% | 12% |
| $R^*_{inside}$ | $\leq 15\%$ | $\leq 12\%$ | 12% | 11% |
| S.C. | $\geq 0.65$ | $\geq 0.70$ | 0.69 | 0.71 |
| $U_{winter}$ | $\leq 0.26$ | $\leq 0.25$ | 0.25 | 0.25 |

*R = reflectance (visible)

Typical ranges of characteristics achieved by this invention when used in a 3-pane IG unit such as shown in FIG. 3A are:

[when surfaces 3 and 5 have coating]

|  | Range | | Layer System | Layer System |
|---|---|---|---|---|
| Characteristics | Broad | Preferred | FIG. 1 | FIG. 2 |
| $T_{vis}$ | $\geq 75\%$ | $\geq 80\%$ | 79.6% | 81.0% |
| $R^*_{outside}$ | $\leq 15\%$ | $\leq 14\%$ | 14.6% | 13.9% |
| $R^*_{inside}$ | $\leq 15\%$ | $\leq 14\%$ | 14.2% | 13.9% |
| S.C. | $\geq 0.50$ | $\geq 0.55$ | 0.56 | 0.59 |
| $U_{winter}$ | $\leq 0.16$ | $\leq 0.15$ | 0.13 | 0.13 |

*R = reflectance (visible)

With respect to the above-referenced IG performance characteristics not previously defined herein, such as $U_{winter}$, R value, etc., those terms are well understood in the art and are used here in accordance with their accepted meaning. For example, the "U" value is a measure of the insulating property of the IG system. $U_{winter}$ is determined according to NFRC 100-91 (1991), a standard subsumed in the WINDOW 4.1 software. "Shading coefficient" ("S.C.") is determined in accordance with NFRC 200-93 (1993), by first determining "Solar heat gain coefficient" and dividing by 0.87.

Once given the above disclosure many other features, modifications, and improvements will become apparent to the skilled artisan. Such other features, modifications, and improvements are, thus, considered a part of this invention, the scope of which is to be determined by the following claims:

We claim:

1. A glass substrate having a sputter coated layer system thereon which from the glass outwardly consists essentially of:
    a) an undercoat layer of a metal oxide or nitride having an index of refraction of 2.35–2.75;
    b) a layer of metallic silver; and
    c) an overcoat layer of a metal oxide or nitride having an index of refraction of 1.85–2.25;
    wherein said layers are of a thickness sufficient such that said glass article has a visible transmittance ($T_{vis}$) of at least 84%, a sheet resistance ($R_s$) of less than or equal to 5.5 ohms/sq., and a normal emissivity ($E_n$) of less than or equal to 0.065 and wherein said layer system does not include any layer consisting essentially of a sub-stoichiometric metallic oxide located between the substrate and the layer comprised of metallic silver.

2. A glass article according to claim 1, wherein said glass substrate is a monolithic sheet of substantially clear glass.

3. A glass article according to claim 2, wherein said glass article exhibits a substantially neutral, non-purple color and a non-mirror-like reflectance whether viewed from the glass side or the film side.

4. A glass article according to claim 1, wherein said undercoat layer consists essentially of $TiO_2$ and said overcoat layer consists essentially of $SnO_2$.

5. A glass article according to claim 4, wherein said layer system further includes a protective layer of a metal oxide between said silver layer and said overcoat layer.

6. A glass article according to claim 5, wherein said protective layer of a metal oxide consists essentially of $TiO_2$.

7. A glass article according to claims 4 or 5, wherein said layer system further includes a nucleating layer of a metal oxide between said silver layer and said undercoat layer.

8. A glass article according to claim 7, wherein said nucleating layer of a metal oxide consists essentially of ZnO.

9. A glass article according to claim 1, wherein said undercoat layer is a member selected from the group consisting of $TiO_2$, $ZrO_2$, PbO, $W_2O_3$, SiZrN, SiTiN, and mixtures thereof.

10. A glass article according to claim 9, wherein said overcoat layer is a member selected from the group consisting of ZnO, $SnO_2$, $In_2O_3$, $Si_3N_4$ and mixtures thereof.

11. A glass article according to claim 9, which further includes an upper intermediate layer located between said silver layer and said overcoat layer, wherein said upper intermediate layer is selected from an oxide or a nitride of Al, Ti, Zn, Sn, Zr, Cr, Ta, Mg or mixtures thereof.

12. A glass article according to claims 9, 10, or 11, which further includes a lower intermediate layer located between said undercoat layer and said silver layer, wherein said lower intermediate layer is selected from an oxide or nitride of Zn, Ti, Sn, Bi, Si or mixtures thereof.

13. A glass article according to claim 1, wherein said undercoat layer has a thickness of about 160 Å–320 Å, said silver layer has a thickness of at least about 165 Å and said overcoat layer has a thickness of about 350 Å–700 Å.

14. A glass article according to claim 3, wherein said layer system from the glass outwardly consists essentially of the following layers and thickness:

| Layer | Thickness (Å) |
|---|---|
| TiO2 | 160 to 320 |
| Ag | 100 to 180 |
| TiO$_2$ | 15 or less |
| SnO$_2$ | 350 to 700 |

15. A glass article according to claim 14, wherein said monolithic glass sheet when consisting of clear glass and measured at a thickness of 2 mm exhibits the following characteristics:

$T_{vis}$=84% to 90%
$R_s$=4.5 to 6.5
$E_n$=0.04 to 0.07.

16. A glass article according to claim 3, wherein said layer system from the glass outwardly consists essentially of the following layers and thickness:

| Layer | Thickness (Å) |
|---|---|
| TiO2 | 160 to 320 |
| ZnO | ≦150 |
| Ag | 100 to 180 |
| TiO$_2$ | ≦15 |
| SnO$_2$ | 350 to 700 |

17. A glass article according to claim 16, wherein said monolithic glass sheet when consisting of clear glass and measured at a thickness of 2 mm exhibits the following characteristics:

$T_{vis}$=84% to 90%
$R_s$=4.5 to 6.5 (ohms/sq.)
$E_n$=0.04 to 0.07.

18. A glass article according to claim 1, consisting essentially of from the glass substrate outwardly:

| Layer | Thickness (Å) |
|---|---|
| TiO2 | 290 |
| Ag | 165 |
| TiO$_2$ | 10 |
| SnO$_2$ | 480 |

19. A glass article according to claim 1, consisting essentially of from the glass substrate outwardly:

| Layer | Thickness (Å) |
|---|---|
| TiO2 | 224 |
| ZnO | 52 |
| Ag | 165 |
| TiO$_2$ | 10 |
| SnO$_2$ | 480 |

20. In an insulating glass unit comprised of at least 2 panes of glass and sealed at their peripheral edges to form an insulating chamber therebetween, the improvement comprising at least one of said panes of glass being a glass sheet according to claims 2, 4, 15, 17, or 19, wherein said layer system on said glass sheet is located within a said insulating chamber wherein said insulating glass unit exhibits the following characteristics:

$T_{vis}$=≧75%
$R_{outside}$=≦15%
$R_{inside}$=≦15%
S.C.=≧0.60
$U_{winter}$=≧0.26 and wherein $T_{vis}$ is visible transmittance; $R_{outside}$ is visible reflectance as viewed from outside a dwelling; $R_{inside}$ is visible reflectance as viewed from inside a dwelling; S.C. is shading coefficient; and $U_{winter}$ is an insulating property.

21. An insulating unit according to claim 20, which exhibits the following characteristics:

$T_{vis}$=≧80%
$R_{outside}$=≦12%
$R_{inside}$=≦12%
S.C.=≧0.63
$U_{winter}$=≦0.25.

22. An insulating unit according to claim 20, wherein said unit consists of 3-panes of glass having two insulating chambers therebetween, and wherein at least two of said glass sheets is provided with a said layer system.

23. An insulating unit according to claim 22, wherein each of said two insulating chambers has a layer system located therewithin and wherein said insulating unit exhibits the following characteristics:

$T_{vis}$=≧65%
$R_{outside}$=≦15%
$R_{inside}$=≦15%
S.C.=≧0.50
$U_{winter}$=≦0.16.

24. An insulating unit according to claim 23, which exhibits the following characteristics:

$T_{vis}$=≧70%
$R_{outside}$=≦14%
$R_{inside}$=≦14%
S.C.=≧0.55
$U_{winter}$=≦0.15.

25. A glass substrate having a sputter coated layer system thereon which from the glass outwardly includes:
   a) an undercoat layer having an index of refraction of about 2.35–2.75 selected from the group consisting of TiO$_2$, ZrO$_2$, PbO, W$_2$O$_3$, SiZrN, SiTiN, and mixtures thereof;
   b) a lower intermediate layer selected from an oxide or nitride of Zn, Ti, Sn, Bi, Si or mixtures thereof;
   c) a layer comprised of metallic silver; and
   d) an overcoat layer comprised of a metal oxide or nitride having an index of refraction of about 1.85–2.25;
   wherein said layers are of a thickness sufficient such that said glass article has a visible transmittance ($T_{vis}$) of at least about 84%, a sheet resistance ($R_s$) of less than or equal to about 5.5 ohms/sq. and a normal emissivity ($E_n$) of less than or equal to about 0.065 and wherein said layer system does not include any layer consisting essentially of a substoichiometric metallic oxide located between the substrate and the layer comprised of metallic silver.

26. A glass article according to claim 25 wherein said overcoat layer is a member selected from the group consisting of ZnO, SnO$_2$, In$_2$O$_3$, Si$_3$N$_4$ and mixtures thereof.

27. A glass article according to claim 25 which further includes an upper intermediate layer located between said silver layer and said overcoat layer, wherein said upper intermediate layer is selected from an oxide or a nitride of Al, Ti, Zn, Sn, Zr, Cr, Ta, Mg and mixtures thereof.

* * * * *

UNITED STATES PATENT AND TRADEMARK OFFICE
CERTIFICATE OF CORRECTION

PATENT NO. : 6,132,881
DATED : October 17, 2000
INVENTOR(S) : Klaus W. Hartig, Philip J. Lingle and Steven L. Larson It is certified that error appears in the above-identified patent and that said Letters Patent is hereby corrected as shown below:

Title page,
Item [75] listing of inventors, after "Monroe," delete "both" and substitute -- all --.

Column 2,
Line 3, after "commerially" delete "," (coma).

Column 3,
Line 6, after "resistance" delete "(Re) and emittance (En)" and substitute -- ($R_s$) and emittance ($E_n$) --;
Line 11, after "84%" delete "(R." and substitute -- ($R_S$ --.

Column 8,
Line 65, after "layer" delete ""$a_{15}$"" and substitute -- "$a_1$" --.

Column 11,
Line 50, after "$T_{vis}$" delete "$\geq 75\%$" and substitute -- $\geq 65\%$ --, delete "$\geq 80\%$" and substitute -- $\geq 70\%$ --, delete "79.6%" and substitute -- 70.1% --, delete "81.0%" and substitute -- 71.9% --.

Claim 19, column 13,
Line 51, delete "TiO2" and substitute -- $Tio_2$ --.

Signed and Sealed this

Fourth Day of December, 2001

*Attest:*

*Attesting Officer*

NICHOLAS P. GODICI
*Acting Director of the United States Patent and Trademark Office*